United States Patent
Khojastepour et al.

(10) Patent No.: US 10,110,293 B2
(45) Date of Patent: Oct. 23, 2018

(54) INTERFERENCE ALIGNMENT IN A NETWORK WITH ASYMMETRICAL CHANNEL DIMENSIONS

(71) Applicant: NEC Laboratories America, Inc., Princeton, NJ (US)

(72) Inventors: Mohammad Khojastepour, Lawrenceville, NJ (US); Karthikeyan Sundaresan, Howell, NJ (US)

(73) Assignee: NEC Corporation (JP)

( * ) Notice: Subject to any disclaimer, the term of this patent is extended or adjusted under 35 U.S.C. 154(b) by 322 days.

(21) Appl. No.: 14/742,039

(22) Filed: Jun. 17, 2015

(65) Prior Publication Data

US 2015/0372743 A1 Dec. 24, 2015

Related U.S. Application Data

(60) Provisional application No. 62/014,458, filed on Jun. 19, 2014.

(51) Int. Cl.
*H04L 5/14* (2006.01)
*H04B 7/06* (2006.01)
*H04L 5/00* (2006.01)

(52) U.S. Cl.
CPC .......... *H04B 7/0634* (2013.01); *H04L 5/143* (2013.01); *H04B 2215/00* (2013.01); *H04L 5/0023* (2013.01); *H04L 5/0035* (2013.01)

(58) Field of Classification Search
None
See application file for complete search history.

(56) References Cited

U.S. PATENT DOCUMENTS

| 2009/0052578 A1* | 2/2009 | Sawai | H04B 7/0413 375/299 |
| 2012/0040706 A1* | 2/2012 | Shin | H04W 28/04 455/517 |
| 2014/0003274 A1* | 1/2014 | Clerckx | H04L 25/0204 370/252 |

OTHER PUBLICATIONS

Gomadam, et al. "Approaching the Capacity of Wireless Networks through Distributed Interference Alignment," IEEE Global Telecommunications Conference, Nov. 2008, pp. 1-6.
(Continued)

*Primary Examiner* — Yemane Mesfin
*Assistant Examiner* — Jeff Banthrongsack
(74) *Attorney, Agent, or Firm* — Joseph Kolodka

(57) ABSTRACT

Systems and methods for full-duplex communication in a communications network, including generating a combined channel matrix including two or more channel matrices and determining a null space and a basis for the combined channel matrix. Common, individual, and disjoint vector spaces are determined, and common vector space is determined for each of one or more receiving nodes and each or one or more transmitting nodes, disjoint vector spaces for each of the one or more nodes are determined based on the common vector space for each of the one or more nodes, and individual vector spaces are determined based on the common and the disjoint vector spaces. Signals are mapped at each of the nodes to determine corresponding vector spaces; and interference alignment is performed in common vector spaces and zero forcing in disjoint vector spaces using a hardware processor.

12 Claims, 6 Drawing Sheets

(56) References Cited

OTHER PUBLICATIONS

Yetis, et al. "On Feasibility of Interference Alignment in MIMO Interference Networks," IEEE Transactions on Signal Processing, Nov. 2010, pp. 1-13, vol. 58.
Razaviyayn, et al. "On the Degrees of Freedom Achievable Through Interference Alignment in a MIMO Interference Channel," Apr. 2011, pp. 1-23.
Bresler, et al., "Feasibility of Interference Alignment for the MIMO Interference Channel," Mar. 2013, pp. 1-16.
LTE-Release-11, "3GPP Mobile Broadband Standard, Release 11," http://www.3gpp.org/specifications/releases/69-release-11, Jun. 2013, 2 Pages.

* cited by examiner ness of the spectral efficiency, and the symmetric Full Bipartite
INTERFERENCE ALIGNMENT IN A NETWORK WITH ASYMMETRICAL CHANNEL DIMENSIONS

RELATED APPLICATION INFORMATION

This application claims priority to provisional application Ser. No. 62/014,458 filed on Jun. 19, 2014, which is incorporated herein by reference in its entirety.

BACKGROUND

Technical Field

The present invention relates to interference alignment in a network, and more particularly, to interference alignment in a network with asymmetrical channel dimensions.

Description of the Related Art

The scarcity of frequency band and the ever-growing demand on wireless communication solicit for more spectrally efficient wireless communication techniques. Multiple antenna systems have been on the frontier of the research for the last decade and have reached saturation level. Full duplex communication has been recently absorbed much attention as a disruptive technology that can potentially double the spectral efficiency of wireless systems. A single link full duplex systems have shown to be able to almost reach the theoretical limit of doubling the spectral efficiency under laboratory environment and limited topologies and scenarios.

However, having multiple active transmission links in the same frequency band generates new interference patterns in comparison to the conventional half-duplex systems. In particular, in a cellular system, the uplink transmission may generate the same band interference at nearby downlink receivers. Hence, the promised gain of full duplex systems in doubling the spectral efficiency quickly degrades and makes the full duplex technology not scalable if the interference management is not addressed appropriately.

SUMMARY

A method for full-duplex communication in a communications network, Including generating a combined channel matrix including two or more channel matrices; determining a null space and a basis for the combined channel matrix; and determining common, individual, and disjoint vector spaces. Common vector space is determined for each of one or more receiving nodes and each or one or more transmitting nodes, disjoint vector spaces for each of the one or more nodes are determined based on the common vector space for each of the one or more nodes, and individual vector spaces are determined based on the common and the disjoint vector spaces. Signals are mapped at each of the one or more nodes to determined corresponding vector spaces; and interference alignment is performed in common vector spaces and zero forcing is performed in disjoint vector spaces using a hardware processor.

A system for full-duplex communication in a communications network, including, a channel matrix generation module configured to generate a combined channel matrix including two or more channel matrices; and a null space determination module configured to determine a null space and a basis for the combined channel matrix. A vector space determination module is configured to determine common, individual, and disjoint vector spaces. Common vector space is determined for each of one or more receiving nodes and each or one or more transmitting nodes, disjoint vector spaces for each of the one or more nodes are determined based on the common vector space for each of the one or more nodes, and individual vector spaces are determined based on the common and the disjoint vector spaces. A mapping module is configured to map signals at each of the one or more nodes to determined corresponding vector spaces; and an interference alignment module is configured to perform interference alignment in common vector spaces and zero forcing in disjoint vector spaces using a hardware processor.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
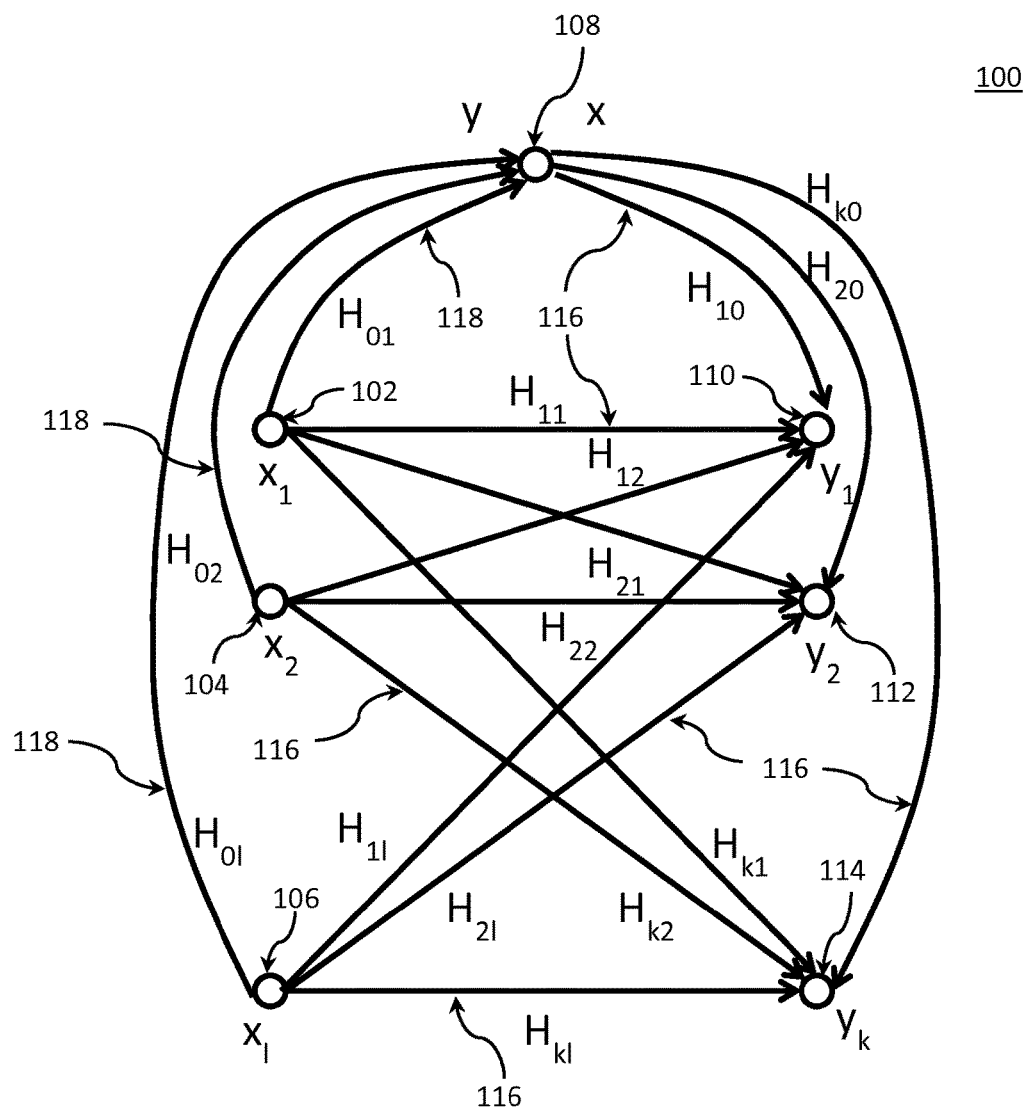
FIG. 1 is a schematic of a single cell channel (SCC) block/flow diagram in accordance with one embodiment of the present principles.

In accordance with the present principles, systems and methods are provided for performing interference alignment in an interference network (particularly when it is heterogeneous). Based on a novel definition of degrees of freedom in acommunication network the signal space at all transmitter and receiver nodes may be categorized into three categories according to one embodiment of the present principles: common, individual, and disjoint subspaces. Further, novel methods to find these subspaces at each node and to determine the precoders and receiver filters that enable access to one and only one of either subspaces are provided according to the present principles. The interference mitigation in these three subspaces may employ different treatments, which may inclued (i) interference alignment, (ii) interference avoidance, and/or (iii) zero forcing.

In one embodiment, Interference Alignment (IA) has shown to be a very effective technique to deal with uplink downlink interference (UDI). IA may be employed to limit the interference from different sources in the same space whenever it cannot be totally avoided. Therefore a main purpose of IA is to minimize the interference spaces used over the whole network and hence maximize the size of an intended signal dimension. The concept of degrees of freedom (DoF) in multiuser channels may provide a measure on the size of useful or intended signal dimension in the network.

In one embodiment, the channel from the uplink to all downlink channels is considered the interference network. In one embodiment, the channel from the uplink to all downlink channels is considered the interference network. The desired communication network, however, may include the uplink channel from the uplink users to the access point and the downlink channel from the access point to all downlink users. The present principles may be employed to perform interference alignment in the interference network particularly when it is heterogeneous.

The classical definition of degrees of freedom (DoF) deals with the degrees of a communication channel or multiple communication channels in the limit of high signal-to-noise-ratio (SNR). This can be interpreted as the number of independent streams that can be sent in each communication channel in the high SNR regime. In one embodiment, the present principles account for DoF per communication node where at a transmitting node, the DoF may be the number of independent dimensions that can be used for transmission; and at each receiver node the DoF may be the number of independent dimensions that may be used for receiving data signals.

Based on a novel embodiment according to the present principles using degrees of freedom in communication networks, the signal space at all transmitter and receiver nodes may be categorized into three categories: common, individual, and disjoint subspaces. Further, the present principles may be employed to find these subspaces at each node and to determine the precoders and receiver filters that enables access to one and only one of either subspaces. The interference mitigation in these three subspaces may employ different treatment, and may include (i) interference alignment, (ii) interference avoidance, and/or (iii) zero forcing.

In one embodiment, a channel model is illustratively depicted according to the present principles. A communication channel that consists of L transmitting nodes which have intended signal for a single node called access point or basestation, and K receiving nodes that receive signal from the same access point may be considered. A memoryless channel between all pair of the nodes that can be accessed simultaneously and the transmission is received by a single node from all transmitting point that are active simultaneously may also be considered. This means that part of the channel may be used by considering some of the transmit signals to be zero. For example, when the access point works in half duplex mode it can either transmit to all or a subset of receiving nodes, and the access point will not receive any signal from the transmitting point. However, in the same scenario, if the transmitting node beside the access point starts a simultaneous transmission with the access point, it may cause an interference with the potential receiving points. A half duplex access point may also receive from all or a subset of transmitting points when it has stopped transmission to the receiving nodes. The transmitting node may also be called the uplink nodes or uplink users and the channel between these nodes and the access point is also called uplink channel. Similarly, the receiving node may also be called downlink nodes or downlink users, and the channel between them and the access point may be called downlink channel.

It is noted that a conventional full duplex access point can transmit in the downlink while it receives in the uplink. However, the situation where a full duplex access point is used is very different from the case where a half duplex access point is deployed. In the latter case, the uplink channel may be used separately from the downlink channel, and hence, there is no interference on the downlink users from the uplink transmission. However, in the former case, where a full duplex access point is used, the possibility of using the full potential of the downlink and uplink channel simultaneously is limited by the fact that the downlink users suffer from the interference caused by the uplink transmissions. As such, the present principles may be employed to solve this problem by presenting an interference management system and method which may be employed for single or multiple cells where the communication channel in each cell is defined by the channel model discussed in further detail below.

Before discussing various embodiments of the present principles in detail, we formally define degrees of freedom (DoF) per node in a communication network according to the present principles. For example, consider a network of L nodes equipped with $N_i$, i=1, 2, . . . , L antennas that are either a transmitting node or a receiving node. The communication channel defined as an oriented graph of edges E on the set of nodes where the component channel between different nodes is assumed to be a Gaussian channel denoted by the channel coefficients matrix $H_{ji}$ with complex entries from the transmitting node i to the receiving node j. A component channel does not exist in the graph if its channel matrix is zero. The receive signal at a receiving node j is defined as:

$$y_j = \sum_{i \in T} H_{ji} x_i + z_j, \forall j \in R \qquad (4)$$

where T is the set of transmitting node indices, R is the set of receiving node indices, $y_j$ is the received signal at the receiving node j, $x_i$ is the transmitting signal at the transmitting node i, and $z_i$ is the Gaussian noise at the receiver of node j.

In one embodiment, the set of component channels is divided into two sets: a set D consisting of the data intended (or desired) communication link and its complement set I, (I∪D=E and I∩D=∅), that consist of the link that their output only causes interference at the receiving node and their corresponding signal does not carry any intended data to this node. One may say that a vector of $\underline{d}=(d_1, \ldots, d_L)$ DoF per node for the nodes 1, . . . , L is achievable if and only if there exist a set of transmit precoders $V_i$ of size $N_i \times d_i$ for the nodes i∈T and a set of receive filters $U_j$ of size $d_j \times N_j$ for the receiving nodes j∈R such that $U_j H_{ji} V_i = 0$ simultaneously. Please note that by definition a precoder and a receive filter is a full rank semi-orthogonal matrices.

It is noted that above definition of per node DoF may be equivalent to the following: Let the interference network defined by the graph (T∪R, I) is amended with L links from the set E' one connected from each transmitting node i∈T to a new node in T' and one link connected from a node in a set of new nodes R' to a different receiving node in R where the number of antennas of the new nodes are the same as the nodes that they are connected to. We say a vector of $\underline{d}=(d_1, \ldots, d_L)$ DoF per node for the nodes 1, . . . , L is achievable if and only if there exist a coding scheme, which achieves the capacity scaling of $d_i \log(\text{SNR}) + o(\log(\text{SNR}))$ simultaneously in the limit of high SNR for all the links in E' for the generic choice of all channels, where channel extension is not allowed.

It is further noted that the above definition of per node DoF clarifies that in one embodiment according to the present principles, once a vector of DOF per node $\underline{d}$ is achievable it is possible to remove the interference network from the original network and replace the number of antennas at each node to $d_i$ instead of $N_i$ and update the component channel coefficients by right and left multiplication with the corresponding precoder and receive filter of transmit and receive nodes of this component channel, respectively. This change would not affect the DoF in the reminder of the network that is defined to be the desired network. We point out that our analysis is solely with respect to the DoF in the network for purposes of illustration, and such reduction may affect the actual capacity region of the channel in a different way. In particular, even different solutions for the precoders and receiver filters that correspond to the same DoF per node may also affect the desired network in such a way that the achievable capacity or throughput in the desired network is different. Nonetheless, in terms of high SNR analysis the reduction obtained by the notion of DoF per node and removal of the corresponding interference network does not change the capacity scaling.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIG. 1, a graph representing a single cell channel (SCC) 100 is illustratively depicted according to one embodiment of the present principles. In one embodiment, a graph of a channel estimation may be illustrated using a graph of a full bipartite interference network (FBIN) between the uplink nodes and downlink nodes as well as a multiple access channel from all the uplink nodes to the access point and a broadcast channel from the access point to all downlink nodes. In one embodiment, as illustrated in the schematic of the SCC 100 the channel 116 (e.g., $H_{10}$, $H_{12}$, $H_{11}$, $H_{20}$, $H_{21}$, $H_{22}$, $H_{21}$, $H_{k0}$, $H_{k1}$, $H_{k2}$, $H_{k1}$) may be composed of a full bipartite graph between the uplink nodes and downlink nodes, as well as a multiple access channel 118 ($H_{01}$, $H_{02}$, $H_{01}$) from all the uplink nodes 102, 104, 106 ($x_1$, $x_1$, $x_2$) to the access point 108 (y, x), and a broadcast channel 118 ($H_{01}$, $H_{02}$, $H_{01}$) Since the interference management is a crucial part of enabling full duplex communication in a single cell, the possible degrees of freedom that are achievable in the full bipartite interference channel (hereinafter "FBIN") between uplink and downlink nodes are concentrated on, and discussed in further detail below with reference to FIGS. 3 and 4.

In one embodiment, when considering only the FBIN (e.g., illustrated in detail in FIGS. 3 and 4), the received signal at each downlink node j, j=1, 2, . . . , K may be given by:

$$y_j = \sum_{i=1}^{L} H_{ji} x_i + z_j \quad (1)$$

where $y_j$ is a vector of size $N_{r,j}$, $x_i$ is the vector of transmit signal of size $N_{y,i}$, and $H_{ji}$ represents the channel between the transmitter i and the receiver j that may be a matrix of size $N_{r,j} \times N_{t,i}$ with entries that may be independent and identically distributed (i.i.d.) circularly symmetric complex numbers with mean zero and variance $\sigma^2$. The total received signal in the original single cell channel (SCC) 100 may be given by:

$$y_j + H_{j0} x_0 \quad (2)$$

where $x_0$ is the transmitted vector from the access point 108, and $H_{j0}$ is the channel 116 from the access point to the receiver j. The received signal at the access point 102, 104, 106, 108 may be given by:

$$y_0 = \sum_{i=1}^{L} H_{0i} x_i + z_0 \quad (3)$$

where $y_0$ is a vector of size $N_{r,0}$ and $H_{0i}$ represent the channel between the transmitter i and the access point. The noise at each receiver may be represented by $z_j$ (subscript zero may indicate the access point) that is a vector of zero mean unit variance circularly symmetric complex white Gaussian noise.

In one embodiment, the present principles may be employed in cellular networks where Full Duplex (FD) access points are employed for interference alignment. Recent results on the development of the practical techniques to enable full duplex shows that the use of single band full duplex communication systems in order to potentially double the spectral efficiency is one of the major research topics in the future of our wireless communications. Although several implementations of the single link full duplex (FD) systems have been reported in the past few years, one of the major limiting factors in the deployment and further development of these systems has been identified as the limitation of having mixture of uplink and downlink users in a single cell that are working in the same band.

In particular even though a well designed and sophisticated approach can be used at the basestations or access points (APs), an uplink user generates an interference in nearby downlink clients that are working in the same band. Hence, until the problem of uplink interference on downlink users is not properly addressed, the potential doubling of spectral efficiency is not possible in multi-user systems and particularly in single cell wireless communication systems.

In one embodiment, the present principles employ DoF per communication node to provide results on a single cell equipped with full duplex access points. In contrast to conventional systems showing limited performance of using FD in single cell, the present principles may be employed to improve (e.g., double) the spectral efficiency by using FD access points in comparison to half duplex (HD) access points with proper design of interference alignment scheme according to the present principle.

In one embodiment, a simple selection of four users (e.g., two in the uplink and two in the downlink), may suffice to achieve the full potential of the full duplex system according to the present principles. This simple example has a very important practical consideration in which the overhead of implementing the interference alignment and calculation of precoders and receiver filters is considered. It is noted that increasing the number of channels that need to be estimated and fed back as well as the forward signaling of the precoders and receive filters within the coherence time of the channel could be a very important practical consideration, and hence limiting the number of users needed to attain the full benefit of a FD AP may be an important factor.

In one embodiment, to maximize the uplink and downlink throughput, the interference received at the downlink users from the uplink nodes may be mitigated. Different approaches for interference alignment exist that could include symbol level interference alignment (e.g., by using lattice codes, or by using linear precoding to mitigate interference in time domain, subcarrier domain, space domain (for multiple antenna systems) or combination of the three). The interference management in time domain might need the use of channel extension, and assumption of having time varying channel. There are several practical considerations with channel extension in the time domain. For example, the channel has to be time varying with a rate that we get enough random channel realization in order to perform linear precoding and possible interference alignment that is effective, while the assumption of knowing the channel at the transmitter forces us to have slow variation in the channel so that we can estimate the channel and more importantly to have small channel estimation overhead in comparison to the time that the channel estimates are valid to be used for the actual data transmission.

In one embodiment, the interference alignment in the subcarrier domain may be done similarly as the one in the space domain. Therefore, it is possible to consider subcarriers as different antennas and convert the system to a multiple antenna system with larger number of antennas acccording to the present principles. It is noted that this transformation may change the channel properties (e.g., it may introduce correlation between the channel coefficients).

Figure 2:
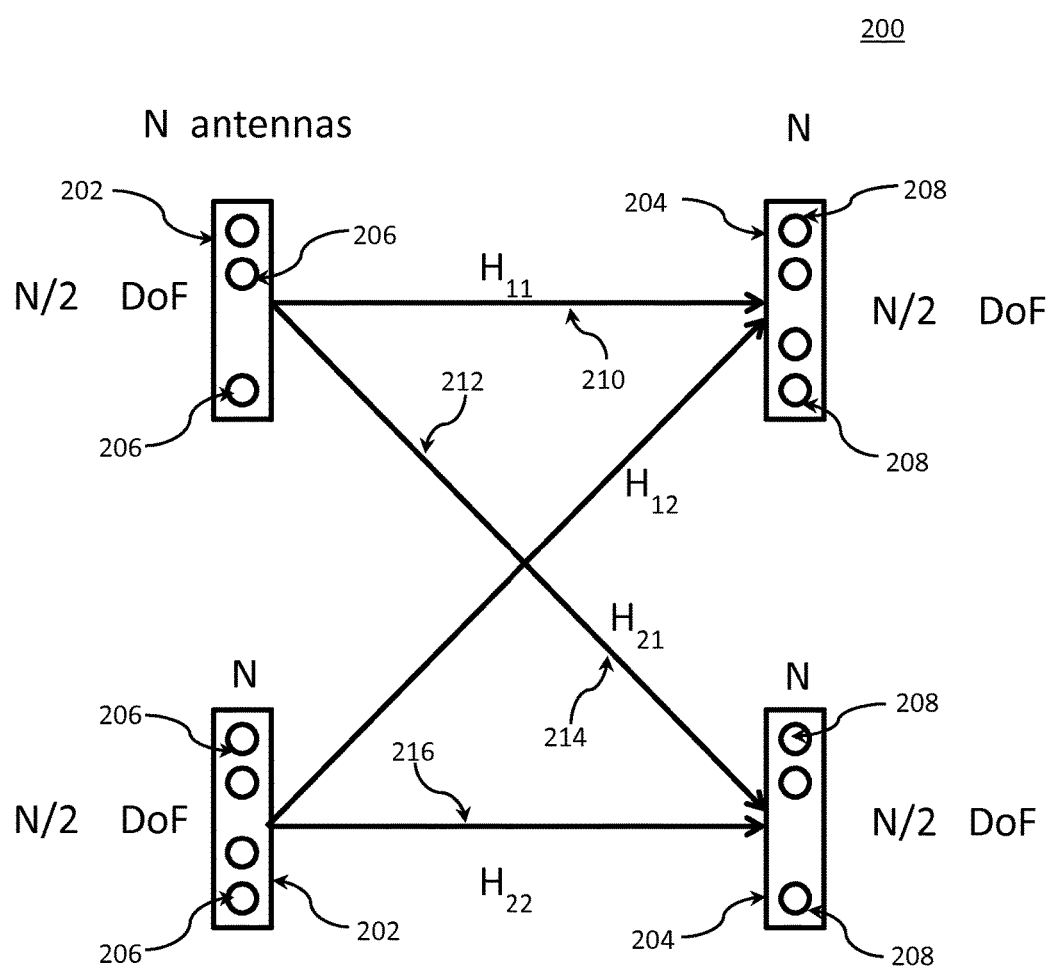
FIG. 2 is a schematic depicting the degrees of freedom available in one embodiment of a symmetric Full Bipartite Interference Channel (FBIC) in accordance with one embodiment of the present principles.

Referring now to FIG. 2 with continued reference to FIG. 1, a schematic depicting the degrees of freedom available in one embodiment of a symmetric 2,2 FBIC is illustratively depicted according to one embodiment of the present principles. In one embodiment, one or more transmitting nodes 202 including one or more antennas 206 may transmit to one or more receiving nodes 204 including one or more antennas 208. It is noted that the number of antennas may be equal or may be different in each node. Data may be transmitted from transmitting nodes 202 over channels 210, 212, 214, 216 to receiving nodes 204, and interference alignment may be performed according to one embodiment of the present principles.

Figure 3:
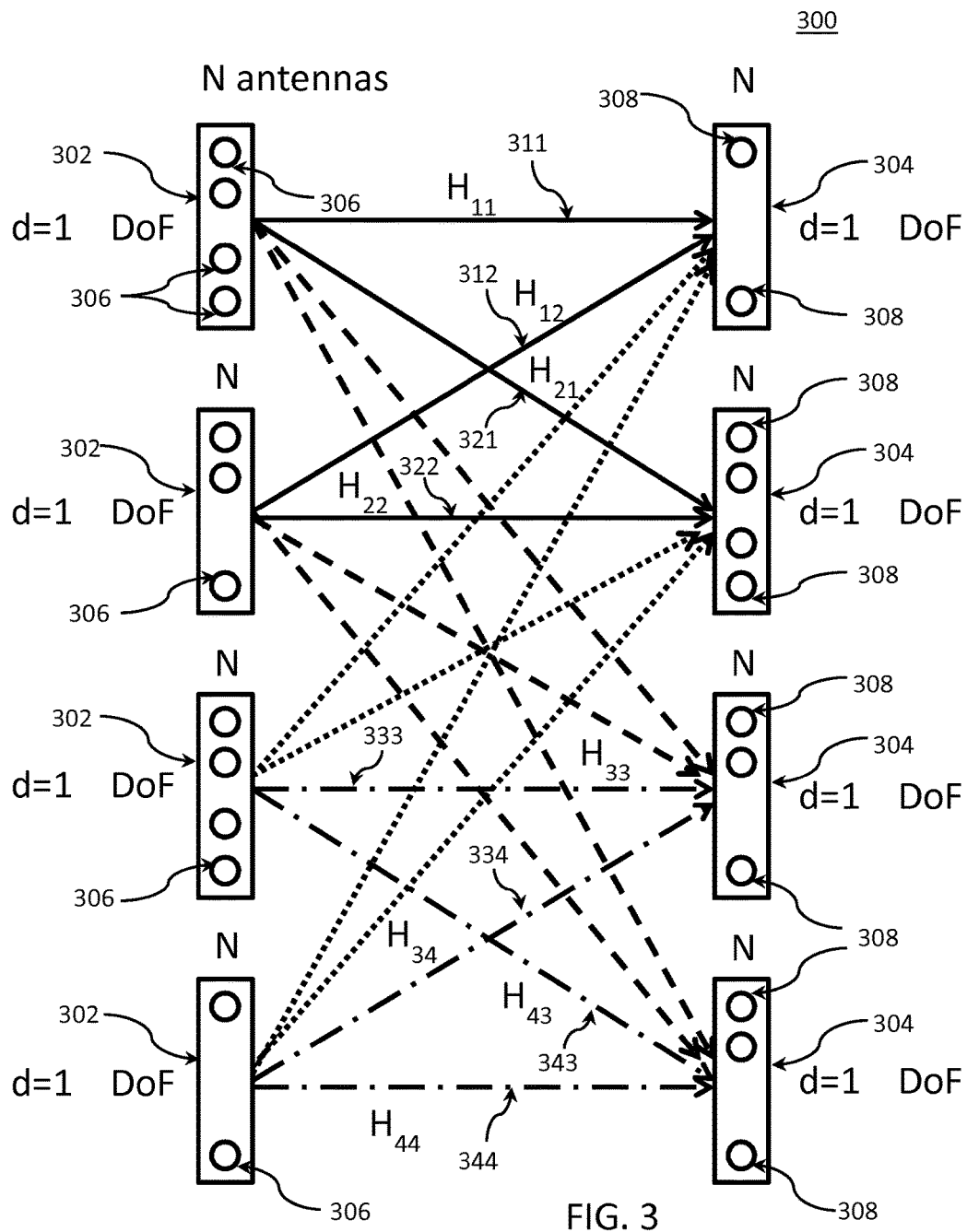
FIG. 3 is a block diagram illustrating a full bipartite interference channel (FBIC) depicting transmit and receive precoding filters and interpretation of channel reduction in accordance with the present principles.

For practical reasons, we focus on the interference alignment in space domain where the channel coefficients are fixed. We consider a fixed precoder per block or multiple block of transmission within the channel coherence time where the channel coefficients are approximately constant. As shown in FIG. 1, a transmit precoding matrix $V_i$, i=1,2, ..., L may be considered at each transmission node and a receiver filter or a receive precoding matrix $U_j$, j=1,2, ..., K at each receiving node. FIG. 3 depicts full bipartite interference channel (FBIC) depicting transmit and receive precoding filters and interpretation of channel reduction. The transmit precoding matrices $V_i$ are of dimensions $N_{t,i} \times d_{t,i}$ where $d_{t,i} \leq N_{t,i}$ and receive filters $U_j$ are of dimension $d_{r,j} \times N_{r,j}$. It is noted that the precoding matrices $V_i$ and $U_j$ are both required to be full rank, and for simplicity are considered to be semi-orthogonal matrices, which means that the rows of $U_j$ (the columns of $V_i$) are orthonormal (mutually orthogonal and have unit norm). The alignment condition may then be given by:

$$U_j H_{ij} V_i = 0 \ \forall i=1,2,\ldots,L, \text{ and } j=1,2,\ldots,K \quad (5)$$

where $H_{ji} \in I$ denotes the component channels of the interference network from node i to node j. It is noted that the alignment conditions may be written in terms of rows of $U_j = [u_j^1 u_j^2 \ldots u_j^{d_{r,j}}]^T$ and the columns of $V_j = [v_j^1 v_j^2 \ldots v_j^{d_{r,j}}]$. This means that all vectors $u_i^a$ and $v_j^b$ for a given i and j and for all indices a and b satisfy similar equations $$u_i^a H_{ij} v_j^b = 0 \quad (6)$$

In some embodiments, the above condition provides several conditions that can be necessary. First, the degrees of freedom of a receiving node j that is the number of independent vectors $v_j^b$ cannot be more than the dimension of the vector space that contains this vector, hence $d_{i,j} \leq Nt,j$. Similarly, for $u_i^a$ we have $d_{r,i} \leq Nr,i$ that is the second necessary condition. There are two more conditions that can be deduced from (6). The third necessary condition is given by $d_{r,i} + d_{t,j} \leq \max N_{r,i}, N_{t,j}$. This is true due to the fact that if $N_{r,i} \geq N_{t,j}$ for a given i and j all vectors $H_{ij} v_j^b$ have to be linearly independent since $H_{ij}$ is generic and furthermore they are orthogonal to all $u_i^a$ which means that the total number of such vectors are less than the dimension of the vector $u_i^a$ that is $N_{r,i}$.

In one embodiment, a fourth necessary condition may be obtained by counting the number of scalar variables and scalar equations or constraint that the variable have to satisfy. The intuition obtained from the linear algebra is that a system of linear equation most likely does not have a solution if the number of variables are less than the number of constraint is the coefficients of the equations are generic. Although the formulation based on the DoF per node is slightly different, this counting argument for DoF in classical interference channel has been presented by several prior work and has been shown to be a necessary condition[?, ?, ?]. The number of variables in a subset of equations S between the transmit and receiving node pair (i, j) is given by:

$$\Sigma_{i:(i,j) \in S} d_{t,i}(N_{t,i} - d_{t,i}) + \Sigma_{j:(i,j) \in S} d_{r,i}(N_{r,i} - d_{r,i}) \text{ where}$$

$$S \subseteq M = \{(i,j), 1 \leq i \leq L, 1 \leq j \leq K\} \quad (7)$$

On the other hand, the number of scalar equation in the same set S is given by $\Sigma_{i,j:(i,j)\in S} d_{t,i} d_{r,j}$. Therefore the fourth necessary condition is given by:

$$\sum_{i:(i,j)\in S} d_{t,i}(N_{t,i} - d_{t,i}) + \sum_{j:(i,j)\in S} d_{r,i}(N_{r,i} - d_{r,i}) \geq \sum_{i,j:(i,j)\in S} d_{t,i} d_{r,j} \forall S \subseteq M \quad (8)$$

In one embodiment, in the case that multiple cells are deployed, the coordination between the access point is usually the key. For example, consider traditional half duplex system with multiple cells. The interference caused by the users or access point in one cell will affect the users and the access point in the other cell, hence the achievable throughput in adjacent cell will drop. However, the coordination between the access point would potentially make the system to work as a giant multiple antenna systems where the antennas are distributed in different location. The level of coordination between the access point, however, is a function of available backhaul (e.g., its capacity and its latency) between the access points. The Coordinated Multi-Point (CoMP) transmission and reception has been one of the study items in recent standards. The downlink CoMP is usually easier to implement due to the fact that all precoding calculations and encoding process may be performed at a central location and then forwarded to the access points that are involved in transmission.

On the other hand, realization of uplink CoMP with processing in a central location may require transmission of the received signals in the backhaul. Since the computed signals in downlink CoMP are in digital form, it is usually much easier to be sent in the backhaul while the dimension of the uplink received signals even after analog-to-digital conversion are much larger than the signals that need to be transmitted to enable downlink CoMP. Therefore, it might be desirable to also consider systems that deploy downlink CoMP but not the uplink CoMP. In one embodiment according to the present principles, it is assumed that full downlink and uplink CoMP is deployed by basestations in either scenario of systems with half duplex access points or full duplex access point.

Figure 4:
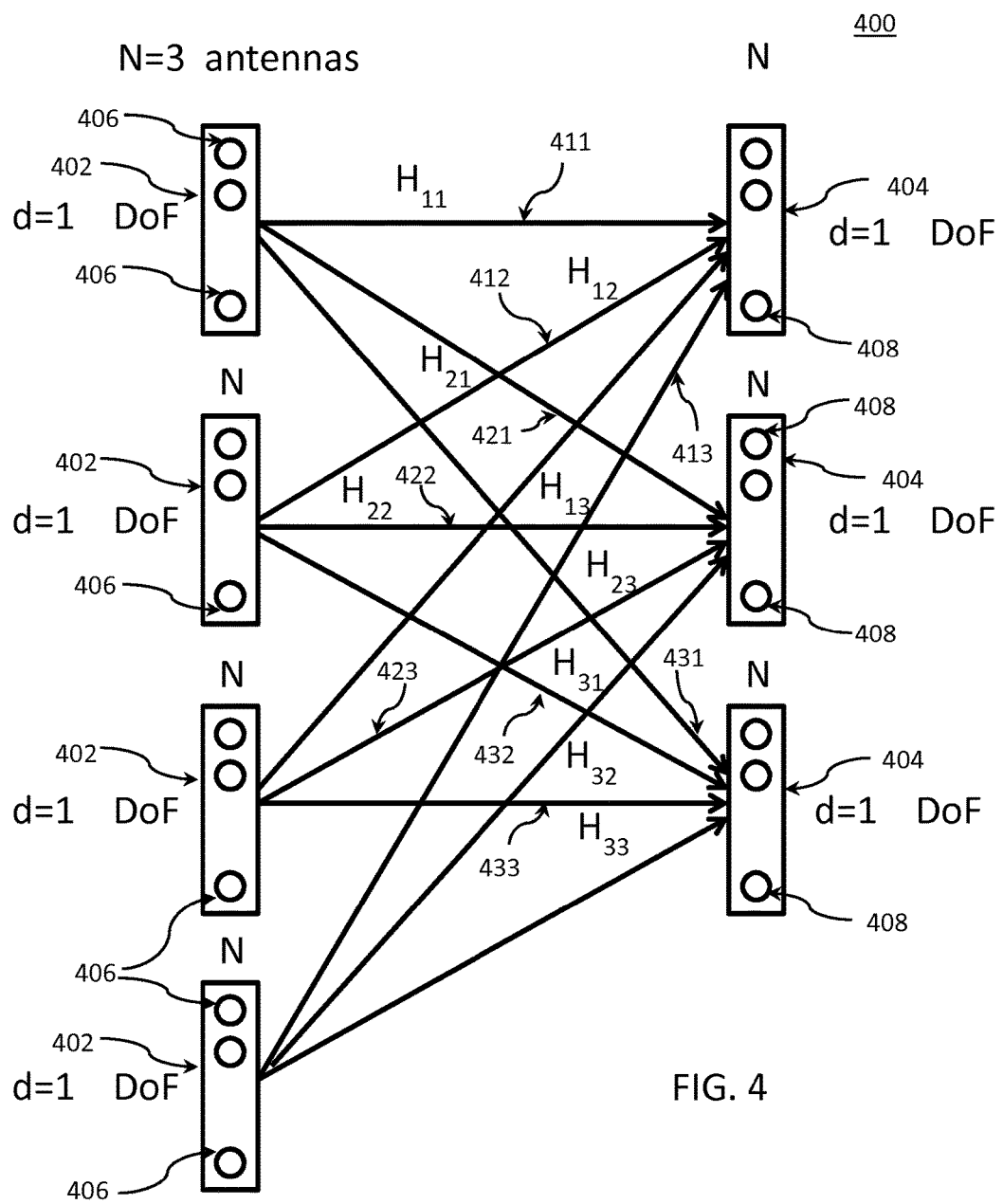
FIG. 4 is schematic depicting the degrees of freedom available in one embodiment of an asymmetric Full Bipartite Interference Channel (FBIC) in accordance with one embodiment of the present principles in accordance with the present principles.

Referring now to FIGS. 3 and 4, schematics of other embodiments of full bipartite interference channel (FBIC) configurations (including asymmetrical in FIG. 4) for use with the method, systems and computer program products of the present disclosure are illustratively depicted according to one embodiment of the present principles. In one embodiment, one or more transmitting nodes 302, 402 including one or more antennas 306, 406 may transmit to one or more receiving nodes 304, 404 including one or more antennas 308, 408. It is noted that the number of antennas may be equal or may be different in each node. Data may be transmitted from transmitting nodes 302, 402 over one or more channels (e.g., 311, 312, 321, 322, 333, 334, 343, 344, 411, 412, 413, 421, 422, 423, 431, 432, 433) to receiving nodes 304, 404, and interference alignment may be performed according to one embodiment of the present principles.

The full bipartite interference channel (FBIC) that has been described above with reference to FIGS. 1, 2, 3 and 4 is distinguishable from typical interference channels. The channels may seem to have similarities at a first glance. Both channels are multi-user channels, there are a set of transmitters and another set of nodes that are receivers. Each receiver sees multiple interfering signals. However, there the number of transmitting nodes and receiving nodes in a conventional, i.e., non-FBIC, interference channel are always equal, and there is a one to one correspondence between each transmitting node to a receiving node. The intended signals that are received by each receiver is the signal that is transmitted from the corresponding transmitting point. Therefore, with for example K transmit-receive pairs, there are only K degrees of freedom in the channel where degrees of freedom are in fact associated with K direct links between the corresponding transmit and receive pairs.

However, the degrees of freedom for FBIN channel may be defined per node which means that for example degrees of freedom of each of the transmitting node could be equal to 2 while degrees of freedom of all receiving nodes are equal to 1. This means that each transmitting node can in fact transmit in two independent and orthogonal direction while it interferes with all receiving nodes but leave them at least with one degree of freedom or one channel direction that is interference free and hence can be used by another node, e.g., the access point to receive information.

This situation is very different from the one in the interference channel where degrees of freedom are defined per direct link between the corresponding transmit-receive pair and it is not useful to have a transmit precoder or a receive filter that is potentially has larger dimension than the other one. We also note that due to the full connection between all transmitting and receiving nodes, there is a modularity property that can be used in some cases to find algebraic solution for large systems by breaking them out into smaller channels.

In one illustrative embodiment, a single cell wireless communication network with an access point (AP) indexed as node 0 and collection collection of L uplink and K downlink users where the desired network consists of (i) a multiple access channel from all uplink nodes to the AP and (ii) a broadcast channel from the AP to all downlink nodes may be considered. The interference network may include all the channels between the uplink and downlink users that can be modeled as a FBIN(L,K).

First, it is noted that in this model with a FD AP with N transmit and N receive RF chains the total DoF is given by $$DoF_{FD} = \min\left(N, \sum_{i=1}^{L} d_{t,i}\right) + \min\left(N, \sum_{i=1}^{K} d_{r,i}\right) \quad (9)$$

where $d_{t,i}$, i=1, ..., L, and $d_{r,i}$, i=1, ..., K are the per node DoF at the transmitting and receiving nodes, respectively. The proof relies on the fact that (i) by removing the FBIN and replacing the number of antennas at each node with its per node DoF we are only left with the desired network that consists of two separate MAC and BC, and (2) the DoF for a MAC or BC is the minimum of the number of antennas at the AP and the sum of DoF of its users. On the other hand if the AP is only HD with N antennas, then the total DoF can be found for either uplink (UL) or downlink (DL) as $$DoF_{HD,UL} = \min\left(N, \sum_{i=1}^{L} d_{t,i}\right), \quad (10)$$

$$DoF_{HD,DL} = \min\left(N, \sum_{i=1}^{K} d_{r,i}\right) \quad (11)$$

respectively.

Second, it is shown that in a FBIN(2,2) channel (FIG. 1(b)) with N antenna at each node DoF per node equal to d, d≤N for all uplink users and N−d for all downlink users is simultaneously achievable. Let $V_1$ and $V_2$ be the transmit precoder of size N×d and $U_1$ and $U_2$ be the receive filters of size N×(N−d). The following may be satisfied:

$$U_i H_{ij} V_j = 0 \quad \forall i=1,2, \text{ and } j=1,2 \quad (12)$$

In one embodiment, $V_1$ and $V_2$ may be selected such that $$(H_{11} V_1) \stackrel{S}{=} H_{12} V_2$$

in order to align the interferences of both transmitting nodes into the same space of size N×d dimensions at the receiving node (1,r). Such selection is easy as for any choice of the precoding matrix $V_1$, the precoding matrix $V_2$ can be obtained by choosing $V_2 = H_{12}^{-1} H_{11} V_1$ where for random matrices $H_{ij}$ this can be done with probability 1. In order to align the interferences of both transmitter to the receiving node 2, we may have $$(H_{21} V_1) \stackrel{S}{=} H_{22} V_2,$$

hence it is enough to have $$V_1 \stackrel{S}{=} H_{21}^{-1} H_{22} H_{12}^{-1} H_{11} V_1).$$

This means that $V_1$ can be composed of any d eigenvectors of the matrix $H_{21}^{-1} H_{22} H_{12}^{-1} H_{11}$ and $V_2 = H_{12}^{-1} H_{11} V_1$. Under these conditions the space of signals at both receiving nodes is limited to a d dimensions and hence there exist N−d orthogonal dimensions at each receiving nodes which is used to construct N×(N−d) dimensional receive filters $U_1$ and $U_2$.

While the above argument shows that the total sum of per node DoF in a FBIN(2,2) with N antennas at each node can be equal to 2N the following argument shows that in fact this is the maximum value that this sum can take. Let $d_{t,i}$ and $d_{r,i}$, i=1,2 denote the degrees of freedom of transmitting nodes and receiving nodes, respectively. Using the counting argument (??), we have $$\sum_{i=1}^{2} d_{t,i}(N - d_{t,i}) + d_{r,i}(N - d_{r,i}) \geq \sum_{i=1}^{2} \sum_{i=1}^{2} d_{t,i} d_{r,j} \quad (13)$$

Rearranging the above inequality, the following may hold:

$$(d_{t,1} + d_{t,2} + d_{r,1} + d_{r,2})N \geq \sum_{i=1}^{2} d_{t,i}^2 + \sum_{i=1}^{2} d_{r,i}^2 + \sum_{i=1}^{2} \sum_{i=1}^{2} d_{t,i} d_{r,j} \quad (14)$$

$$\geq \sum_{i=1}^{2} d_{t,i}^2 + \sum_{i=1}^{2} d_{r,i}^2 + \sum_{i=1}^{2} \sum_{i=1}^{2} d_{t,i} d_{r,j} - \quad (15)$$

$$(d_{t,1} - d_{t,2})^2 - (d_{r,1} - d_{r,2})^2$$

$$\geq \frac{1}{2}(d_{t,1} + d_{t,2} + d_{r,1} + d_{r,2})^2 \quad (16)$$

Hence, we have $$(d_{t,1} + d_{t,2} + d_{r,1} + d_{r,2}) \leq 2N \quad (17)$$

In one embodiment, comparing a the total number of streams that can be simultaneously transmitted in a single cell with FD versus HD AP, one can conclude that it is possible to achieve twice the number of streams with FD AP for a total of 2N streams versus only N streams with HD AP (when N is an even number). Furthermore, to achieve this spectral efficiency gain it is enough to select only two uplink and two downlink users. This shows that using an interference alignment according to the present principles can restore the promised doubling gain of using FD versus HD radios in a multi-user communication systems such as a single cell wireless systems.

A natural question is that what kind DoF per node is possible to achieve by allowing more users to be picked in the uplink and downlink. In the following we argue that the maximum sum of the per node DOF in a FBIN(K,K) channel with a symmetric d DoF per node and N antenna at each node is $$2K \left\lfloor \frac{2N}{K+2} \right\rfloor.$$

Again the counting argument may be employed as a condition. We have $$\sum_{i=1}^{K} d_{t,i}(N - d_{t,i}) + d_{r,i}(N - d_{r,i}) \geq \sum_{i=1}^{K} \sum_{i=1}^{K} d_{t,i} d_{r,j} \quad (18)$$

$$2Kd(N - d) \geq K^2 d^2 \quad (19)$$

$$d \leq \frac{2N}{K+2} \quad (20)$$

and 2K nodes each with degrees of freedom less than or equal to $$\frac{2N}{K+2}$$

that will add up to $$2K \left\lfloor \frac{2N}{K+2} \right\rfloor.$$

This means that for large enough K this total sum tends to 4N according to one embodiment of the present principles.

Although the construction of a solution to achieve this bound will not be discussed in detail for simplicity, this bound is in fact achievable. The implication of this result is as follows. Consider two adjacent cells where the access points have complete cooperation (e.g. using joint transmission in practical systems that are enabled with cooperative multipoint transmission (CoMP)). The two APs may have complete cooperation, hence there is no interference between them. Furthermore, they can use network MIMO which means they can be viewed as a virtual AP with 2N antennas. The uplink users may generate interference to the downlink users in their own cell as well as the adjacent cells. Considering the set of all uplink users and downlink users, the interference network is a FBIN in which total sum of 4N per node DoF is achievable.

Hence, in one embodiment, two FD APs can simultaneously serve 4N streams while replacing them with two HD APs we can only serve 2N streams. Of course this result is asymptotic and requires large number of users to be selected that are properly split between the cells as well as uplink and downlink. Nonetheless, it is very interesting to observe that even in multi-cell systems (2-cells) the promised doubling of the spectral efficiency might still be achievable. It is noted that this scaling may slow down for larger number of cells and may not remain as a factor of two when the number of cells are more than two.

In one embodiment, a transmitter node equipped with multiple antennas (e.g., N antennas) may select any input vector of size N hence the input vector lies in a vector space of all N dimensional complex vectors $C^N$. Similarly, at a receiver node, (e.g., with N antennas), the received vectors lie in a same vector space. However, depending on the channels and the input vectors at the transmitters, the received vectors might only fall in a strictly smaller subspace of the vector space $C^N$. It is important to identify this subspace since the null space of this vector space could be freely used at this node for other communications beside the ones in the current network. This subspace at each node is called the individual subspace and it is defined with respect to a set of input vector spaces and channels that affect the received vector at this node. For example, if the individual vector subspace at a receiver is defined with respect to a subset of channel and the input vectors at the transmitting node denoted by A and another individual vector subspace at the same receiver is defined with respect to another set of channels and transmitter vector spaces denoted by B the individual vector space at this node for the union of A and B is then the intersection of the two individual vector spaces for A and B.

Now the set of received vector may be considered with respect to two different channels. Each channel may induce a vector space at the receiver that is called the image of the transmitter vector space at the receiver node. The two images at the receiver induced by the two channels may or may not intersect. This intersection is called the common vector space and may be used for the purpose of interference alignment. Finally, the remaining subspace beside common and individual vector spaces at each node may be used to define disjoint vector spaces where the inputs from a disjoint vector space at the transmitters will be received at the receiver in separate (or disjoint) subspaces according to one embodiment. In the following paragraphs, define common, individual and disjoint vector spaces in a communication node are defined according to the present principles, and examples and notations that help to understand the above are provided.

In one embodiment, one of the main challenges to design interference alignment solution for a network with an asymmetrical channel dimensions is to find the intersection of the two image spaces induced on a single node (e.g., (r,1)) from two nodes (e.g., (t,1) and (t,2)), through, for example two channels $H_{11}$ and $H_{12}$. This intersection may be used for different purposes (e.g., to split the signal spaces at each of these three nodes into the common and un-common (or distinct) subspaces). The distinct subspaces can also be further divided into two subspaces of disjoint and individual subspaces. The common, individual, and disjoint subspaces are such that they are orthogonal at each node and are denoted by superscripts c, i and d, respectively.

For example $V_1^c$, $V_1^i$ and $V_1^d$ denote common, individual and disjoint subspaces of vector space denoted by $V_1$, respectively. At each transmitter, e.g. transmitting node (t,1), the transmission vector (sub-) space defined by the columns of the precoder for example $V_1$, $V_1^c$, $V_1^i$, or $V_1^d$. At each receiver (e.g. the receiving node (r,1)), the receiving vector (sub-) space is defined by the rows of the receiver filter for example $U_1$, $V_1^c$, $V_1^d$ or $V_1^i$. The collection of common, individual, and disjoint subspaces may completely define the transmission vector space at a transmitting point or the reception vector space at a receiving node. Therefore, the common, individual and disjoint subspaces are orthogonal and together may from the basis for the entire vector space at the corresponding node.

In one embodiment, the common vector space at node (r,1), denoted by $U_1^c$, is in fact the intersection of the images of the vector spaces $V_1$ and $V_2$ induced from node (t,1) and (r,2) at node (r,1). However, the common vector spaces $V_1^c$ and $V_2^c$ are the inverse image of the intersection space $U_1^c$. The distinct vector space at each node is then defined as the complement subspace to the common vector space at the corresponding node. The disjoint vector space may also be divided into two subspaces: for every transmit and receive pair, the disjoint subspace is defined as the subspace at each node where the transmission from the disjoint subspace is received in the corresponding disjoint subspace. Furthermore, transmission from the other node would not be received at the disjoint subspace at the receiving point corresponding to this transmit-receive pair. The third category of the subspace at each node is called individual subspace where a transmission using a precoder from this subspace at a transmitting point would not be received (does not affect the received signal) at a receiving point. similatly, an individual subspace at a receiving node is defined such that any receive filter from this subspace would receive a null (zero signal) from all transmitter irrespective of what precoders each transmitter is used.

For example, let the image of the vector spaces $V_1$ and $V_2$ induced from node (t,1) and (r,2) at node (r,1) is denoted by $W_1 = H_{11} V_1$ and $W_2 = H_{12} V_2$, respectively. The intersection of these two spaces may or may not be empty depending on the channel matrices. However, for generic choice of channel matrices, the intersection of these vector spaces is nonempty if and only if the image spaces are nonempty (this condition may be automatically satisfied if the channels are generic in a general sense nontheless for a more constrained definition of generic channel matrices it may not be true) and the dimension of the vector spaces satisfy $$\dim(W_1) + \dim(W_2) > \dim(U_1).$$

In fact the size of the intersection subspace for generic channel matrices is equal to $$\dim(U_1^c) = m_1 + m_2 - N_1,$$

where $$m_1 = \dim(W_1) \bmod \dim(U_1),$$

$$m_2 = \dim(W_2) \bmod \dim(U_1),$$

$$N_1 = \dim(U_1).$$

For the generic channel matrices the dimension of a (-an input) vector space is equal to the dimension of its image, hence, $\dim(W_1)$ and $\dim(W_2)$ may be replaced with the dimension of the corresponding input vector spaces $\dim(V_1)$ and $\dim(V_2)$, respectively It is immediate that the dimension of the intersection of two vector spaces is not more than the dimension of either one, i.e., $\dim(U_1^c) \leq \dim(W_1)$ and $\dim(U_1^c) \leq \dim(W_2)$. Also, if the images of two vector spaces in a larger vector space, say dim($U_1$) is considered the dimension of the intersection of the images cannot be larger than the dimension of dim($U_1$), i.e., dim($U_1^c$)≤dim($U_1$). It can be verified that these two intuitive properties hold for the above formulation of the size of the intersection subspace and clarifies the reason behind defining $m_1$ and $m_2$ based on modulo operation. In fact, simply looking at the difference between the dimension of the received vector space and the image vector spaces $\Delta$=dim($W_1$)+dim($W_2$)−dim($U_1$) might be misleading. Even though the condition $\Delta$>0 confirms the intersection subspaces to be nonempty, the dimension cannot simply be deduced from $\Delta$. For example, let dim($W_1$)=1, dim($W_2$)=6, and dim($U_1$)=5. The dimension of the intersection of the images for generic choice of channel matrices is equal to 1 while $\Delta$=2, and clearly the dimension of the intersection cannot be more than dim($W_1$) that is equal to 1.

It is noted that although we formally defined the common, individual, and disjoint vector spaces for communication nodes in a two-transmit one-receive communication channel, the definition can be similarly extended to the reciprocal channel and a more general network with multiple transmitters and receivers according to various embodiments of the present principles.

For illustrative purposes, it is useful to discuss the relation of channel matrices with the concept of common, individual, and disjoint vector spaces. In one embodiment, it is noted that the actual dimension of the intersection might be larger, equal, or even smaller than $m_1+m_2-N_1$ in general when the channel conditions are arbitrary but not generic. This means that even though $\Delta$ is zero or negative there might be still a nonempty intersection between the image of the vector spaces $V_1$ and $V_2$. This is due to the fact that the images of these spaces at node (r,1) depends on the channel matrices $H_{11}$ and $H_{12}$. Let $H_{12}$=$H_{11}$=$h_1$ where $h_1$ is a vector, e.g., $$H_{12} = H_{11} = \begin{bmatrix} 1 \\ 0 \\ 0 \end{bmatrix}$$

It is further noted that irrespective of the length of the vector $h_1$ the images of two transmit vector spaces through their respective channel belong to a one dimensional vector space and are in fact equal. Hence, we note that although $\Delta$ is not positive, the intersection may be non-empty.

In one embodiment, on the other hand, for some positive value of $\Delta$ the intersection might be empty. For example consider two channels in the following form:

$$H_{11} = \begin{bmatrix} 1 & 1 & 1 & 1 \\ 0 & 0 & 0 & 0 \\ 0 & 0 & 0 & 0 \end{bmatrix}$$

$$H_{12} = \begin{bmatrix} 0 & 0 & 0 & 0 \\ 1 & 1 & 1 & 1 \\ 0 & 0 & 0 & 0 \end{bmatrix}$$

Nonetheless, for the generic choice of the channel matrices the size of the intersection subspace may be exactly equal to dim($V_1$)+dim($V_2$)−dim($U_1$) if this value is nonnegative and the intersection is zero if it is zero or negative.

It is noted that the above two examples may also be used to illustrate the individual and disjoint vector spaces in various embodiments. In the first example the individual subspace at the receiver node may be represented by a basis matrix represented, for example, by:

$$U_1^i = \begin{bmatrix} 0 & 0 \\ 1 & 0 \\ 0 & 1 \end{bmatrix}.$$

The disjoint vector spaces can also be illustrated for the second example. The pair of $$\left( \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 1 \\ 0 \\ 0 \\ 0 \end{bmatrix} \right)$$

denotes two matrices where the column span of the first matrix is the vector space at the transmitter 1 and the column span of the second matrix is the vector space at the receiver such that the transmitter (input) vector space is mapped only and only to the receiver (output) vector space. The pair of $$\left( \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 0 \\ 1 \\ 0 \\ 0 \end{bmatrix} \right)$$

denotes the similar for the transmitter 2 and the receiver. Moreover, we note that the vector spaces at the receiver are disjoint where the transmit vector spaces at the transmitter 1 and 2 are defined as above. It is further noted that in the above example the disjoint vector subspaces at either of the transmitter is in fact the whole available vector space at that transmitter, but in general this is not true. For example, we note that in the second example the disjoint vector spaces at the transmitters or the receiver are in fact empty (or null).

In one embodiment, the present principles may be employed to identify the intersection of two vector spaces (e.g., $W_1$ and $W_2$). First, a constructive method for extracting the vector space of the intersection subspace for a generic choice of channel matrices is discussed, and then the construction for the case of arbitrary channel matrices $H_{11}$ and $H_{12}$ is discussed. The property that for a generic choice of channel matrices, any sub matrix of the channel matrices or composition of any two different sub matrices are full rank which indicates that any matrix with independently generated random elements is full rank may be employed according to the present principles. Therefore, at least for the following discussion this property may be equivalent with the meaning of 'generically generated'.

In one embodiment, the intersection in the case of generic channel matrices may be found according to the present principles by defining a Matrix H as a first step, where its column vectors are composed of $m_1$ column vectors from $H_{11}$ and $N_1-m_1$ column vectors from $H_{12}$ (Please note that we could also make this matrix with $m_2$ column vectors from $H_{12}$ and $N_1-m_2$ column vectors from $H_{11}$). The choices of these vectors are arbitrary and different choices will result in different solutions. In one embodiment, a second step is to orthogonalize the columns of H (e.g., using gram-schmidt orthogonalization procedure, QR desomposition, etc.). Without loss of generality, assume that H=QR where Q is a unitary matrix. The third step may include selecting $m_1+m_2-N_1$ vectors from $H_{12}$ where the choice is yet arbitrary and each choice would result in a different solution.

At this point it should be clarified that although there are different possible ways to identify the intersection of two vector spaces, the final results may all the same and the intersection of two vector spaces is the largest subspace that is embedded in both subspaces and it is unique not only in size but also in structure. However, different solutions may result in expressing the intersection vector spaces in terms of different basis that are of course related through a unitary transforation. Nonetheless, for computational purpose further optimization might be conducted (e.g. to find the basis with better accuracy or lower computational complexities).

In one embodiment, the fourth step may be to write each of the $m_1+m_2-N_1$ vectors selected in previous step in terms of the columns of the matrix Q. We note that the column of the matrix Q form a basis for $N_1$ dimensional subspace since H is full rank by the assumption of channel matrices being generic and Q is a unitary matrix. This step will result in total of $m_1+m_2-N_1$ equations between $m_1$ column vectors in $H_{11}$ and $m_2$ column vectors in $H_{12}$. Let $\tilde{H}_{11}$ and $\tilde{H}_{11}$ denote the selected $m_1$ vectors out of columns of $H_{11}$ and $H_{12}$, respectively. These equations may be rearranged and written as $\tilde{H}_{11}R_1=\tilde{H}_{12}R_2$ where $R_1$ and $R_2$ are $m_1 \times (m_1+m_2-N_1)$ and $m_1 \times (m_1+m_2-N_1)$ matrices, respectively.

In one embodiment, the intersection in the case of arbitrary channel matrices may be found according to the present principles. For example, let us define a matrix $G=[H_{11} H_{12}]$ where its column vectors are composed of column vectors from $H_{11}$ and $H_{12}$. We find the null space of G that is a vector space corresponding to the set of all solutions x to the homogeneous equation Gx=. We use the notation N(G) to denote a basis corresponding to the column vectors of the matrix N(G) for the null space of G. Corresponding to the split of the columns of G into $N_{t,1}$ and $N_{t,2}$, we split the rows of N(G) into $N_{t,1}$ and $N_{t,2}$ and define $$\begin{bmatrix} G_1 \\ G_2 \end{bmatrix} = N(G)$$

where $G_1$ is a $N_{t,1} \times N_{r,1}$ matrix and $G_2$ is a $N_{t,2} \times N_{r,1}$ matrix. It is noted that $GN(G)=0$ Hence, $H_{11}G_1=-H_{12}G_2$ which means that we have found a vector space that is common between the images of received signals from the first and second transmitter going through their respective channel.

In one embodiment, it can be shown that the columns of $H_{11}G_1$ forms a basis for the common vector space at the receiver node. The inverse image of this vector space through either of the channels defines the common vector spaces at for the corresponding transmitter. Hence, the column of $G_i$ defines the basis for the common vector space at the transmitter i. The precoders $G_i$, i=1,2, denote the transmit precoders corresponding to the common vector spaces at the transmitters 1 and 2, respectively and $(H_{11}G_1)^T$ denotes the receiver filter at the receiver node corresponding to the common vector space at the receiver.

Due to orthogonality of the common and disjoint subspaces, we only need to search the null space of $G_i^T$, i=1, 2, and $(H_{11}G_1)^T$. To find the disjoint vector spaces we note that there would be two orthogonal vector spaces in the null space of $(H_{11}G_1)^T$ where each one correspond to only and only one vector space used for transmission from each one of transmitters in the corresponding null space of $G_i^T$. Hence, it is enough to find the intersection of two vector space defined by N ($G_i^T$) and $H_{11}$. The matrices $A^{(1)}=[H_{11}N(G_1^T)]$ $A^{(2)}=[H_{12}N(G_2^T)]$ may be formed, and may use a similar procedure used above for the matrix G to find the intersection for $A_i$, i=1,2. The resulting intersections may be orthogonal and may define the disjoint vector spaces at the receiver. The disjoint vector space at either of the transmitters can be obtained though finding the inverse image through corresponding channel. Finally, to find the individual vector (sub-) spaces at each node, the null space of the space defined by the common and disjoint subspaces at each node may be found according to one embodiment of the present principles.

In one embodiment, the present principles may be employed for interference alignment for cellular networks with full duplex access points. In a cellular network with full duplex access point, one might encounter scenarios where clients have varied number of antennas. Such cases may be considered to illustrate and understand when and how interference alignment can be applied in order to have efficient and scalable full duplex communication system according to the present principles.

For example, Case 1: All clients have M=1 antenna—Although the AP may have multiple, say N antennas, if the HD clients are all restricted to a single antenna, no spatial IA is possible. Hence, UDI will have to be addressed by relying on client separation, side channels, etc. However, it is hard to scale such approaches from single stream (in either direction) to MIMO FD systems. Consequently, it might be beneficial to operate the system in half-duplex in such cases (especially for large N), where MU-MIMO can be applied to generate N streams in a single direction.

In another example, Case 2: All clients have M(1<M≤N) antennas—Here IA in a cellular communication network with full duplex access point can be applied to deliver 2M streams in FD. However, depending on how 2M compares to N, one still needs to decide whether to operate the system in FD or HD.

In another example, Case 3: Some clients have M(1<M≤N) antennas and others have N antennas—This is a practical scenario that can arise often. For example, smartphones/tablets with two antennas and laptops, smart TVs with more antennas. We show that the performance of interference alignment in a cellular communication network with full duplex access point is not restricted by clients with lesser antennas (i.e. 2M streams), but provides a graceful performance (M+N streams) utilizing all the available antennas in the system effectively.

For illustrative purposes, a theorem and proof will be discussed in the following paragraphs to assist in understanding interference alignment according to the present principles.

Theorem 1—Interference alignment in a cellular communication network with full duplex access point delivers M+N streams with four HD clients, two each with M and N antennas respectively (M,N being even). Proof—We provide a proof for the case that M and N are both even integers. Without loss of generality let us assume that M≤N. We use the following construction to achieve M+N streams. Each of two clients with M antennas as the UL clients transmit M/2 desired streams to the AP on UL and the other two clients with N antennas serve as the DL clients receiving N/2 streams each from the AP on the DL. Thus, there are M streams on the UL interfering with N streams on the DL. Based on the dimension counting argument, the number of variables $$\frac{N^2 + M^2}{2}$$

is greater than the number of interference constraints MN. Hence, the necessary conditions are satisfied for this topology according to one embodiment.

In one embodiment, a construction that shows that in fact it is possible to have DoF per node that are half of the number of antennas at each node is provided. First we note that the precoders and receiver filters at each node denote a subspace of the vector space defined by the number of antennas at each node. At a transmitter node this vector space is used for the transmission and at a receiver node this space is free of interference from the transmission performed in the uplink and can be used for reception of the signal from AP. If we have two vector spaces of size M in the uplink their image in each of the receiver node has an intersection that is of size 2M−N if the channels between the uplink and downlink nodes are generic. In order to find this intersection we consider the channels from the uplink nodes to a downlink node, e.g., $H_{12}$ and $H_{11}$. let us denote the column of these two matrices by $h_1, \ldots, h_M$ and $g_1, \ldots, g_M$, respectively. The matrix $A=[h_1, \ldots, h_M, g_1, \ldots, g_{N-M}]$ is full rank by the assumption of the channels being generic. Therefore, we can write the 2M−N vectors $h_{N-M+1}, \ldots, h_M$ in terms of the columns of A, e.g., $$g_{N-M+k} = \sum_{i=1}^{M} \alpha_1^k h_i + \sum_{i=1}^{N-M} \beta_1^k g_i \quad (21)$$

By rearranging the above equation we find the vectors that are in the intersection of the images of the transmit vector spaces at this receiver. We have the following $$w_k = \sum_{i=1}^{M} \alpha_1^k h_i = g_{N-M+k} - \sum_{i=1}^{N-M} \beta_1^k g_i \quad (22)$$

In one embodiment, under the condition of the channel being generic, it is shown that the collection of the vectors $w_k$ generates a full rank matrix $C=[w_1, \ldots, w_{2M-N}]$. The inverse image of the matrix B in the vector spaces of the two transmitting nodes defines the subspaces that intersect at the receiver node and we denote them by $C_1$ and $C_2$ for the two transmitting nodes 1 and 2, respectively. We call these vector spaces the common vector spaces. The orthogonal subspaces with these vector spaces at the transmitting nodes 1 and 2 and the receiving point are called the disjoint vector spaces and denoted by $D_1$, $D_2$ and D, respectively.

In one embodiment, the property of the above vector spaces may be as follows:

For generic channel condition, the size of C is N×(2M−N),

For generic channel condition, the size of $C_1$ and $C_2$ is equal to M×(2M−N), For generic channel condition, the size of D is N×2(N−M), For generic channel condition, the size of $D_1$ and $D_2$ is equal to M×(N−M), Any precoding vector that lies in the spaces defined by $D_1$ or $D_2$ will be received in the spaces defined by D, Any precoding vector that lies in the spaces defined by $C_1$ or $C_2$ will be received in the spaces defined by C, Any two streams transmitted from two transmitters by using two precoding vector that lies in the spaces defined by $D_1$ and $D_2$, respectively, will be received in disjoint subspaces of the vector spaces defined by D, Any streams received in a vector space that lies within the vector space defined by C can be mapped to a transmission that has happened from either transmitting node 1 or 2 where the precoding matrix defines a subspaces of the vector spaces $D_1$ or $D_2$, respectively.

In one embodiment, given the above property, it is evident that the disjoint vector spaces do not need any interference alignment and we can freely choose any subspace of size $$\frac{N-M}{2}$$

at the transmitter and they will take away at most $$2 * \frac{N-M}{2}$$

at each of the receiving nodes. On the other hand, in the common vector spaces, one can apply the same construction used for the symmetric FDIC to generate additional $$\frac{2M-N}{2}$$

degrees of freedom per node according to the present principles.

In one embodiment, interference alignment (IA) may be constructed based on reciprocity according to the present principles. It is noted that in some situations, it is simpler to perform a design in a reciprocal channel and then translate it to the solution for the original channel. For example, consider a heterogeneous case when the number of antennas at the uplink clients (M) is more than it's at the downlink clients (N). In this case, one may think that it is not possible to get a capacity proportional to M+N. It turns out that IA solution for the case M<N is much simpler to understand and design in comparison to that of M>N. Let us take a simple case when M=4 and N=2 then we only have one dimension at the downlink client to align your two streams from the uplink transmitters. Hereinbelow we present a construction based on reciprocity according to the present principles.

In one exemplary embodiment, it is noted that in the case M<N (as this would be the case with M=2 and N=4) each UL client sends only one stream each and each DL client has two additional DOF (other than the 2 for its own streams) to handle the two UL streams. Hence, one can simply understand that interference suppression is sufficient to handle UDI (without leveraging IA) and is not an interesting example to showcase the use of IA. On the other hand, the counter-part set-up of M=4 and N=2 requires IA to address UDI and M+N streams is indeed possible in this scenario. Although, it might appear infeasible at the outset, please note that this is an asymmetric set-up with the UL-DL interference channel being 4×2 in dimension. Hence, it is possible to construct an IA solution that will allow the 2 UL streams from each UL client to be aligned at a DL client, while still allowing the DL client to receive its single desired stream according to the present principles.

Further, alignment of the UL streams at a DL client does not lead to alignment of the desired UL streams (reduction in DoF) at the AP due to the channels being random in nature. We have mentioned these reasons in this paper now but only briefly (so as to not affect the flow of the paper) during the discussion on heterogeneity both in the solution and in the evaluation. For a better understanding of the above, we now provide a more detailed discussion using a short and long explanation as outlined below.

In one embodiment, the short explanation may be as follows. Short explanation: Using channel reciprocity, an interference alignment solution in a bipartite (interference) graph can always be replaced in a reverse direction by making all transmitters, the receivers and all receivers the transmitters and change the direction of the channels. This means that if in a two node transmit and two node receive bipartite graph with M, and N antennas at each transmitter and receiver, respectively, it is possible to achieve c and d degrees of freedom per node for each transmitter and receiver, respectively, then by exchanging transmitters and receivers, it is possible to achieve c and d degrees of freedom per node for each receiver and transmitter, respectively, where each receiver and transmitter are equipped with M, and N antennas, respectively.

In one embodiment, the long explanation may be as follows. Long explanation with a construction: Consider two transmitters with M=4 antennas each and two receivers with N=2 antennas each. Let $H_{ij}$ denote the channel from transmitter j to the receiver i. We would like to find two 2×1 receive vectors $v_1$ and $v_2$ each from a one-dimensional vector space at each DL client and two 4×1 transmit vectors $w_1$ and $w_2$ each from a two-dimensional vector space at each UL client such that $v^*_i H_{ij} w_j = 0$ for all i=1, 2 and j=1,2. At first it may seem impossible because two independent transmissions from each transmitters might exhaust the two available dimensions at each receiver.

Now let us consider a different problem, as an example according to the present principles. Consider two transmitter with M=2 antenna each and two receiver with N=4 antenna each. Let $G_{ij}$ denote the channel from transmitter j to the receiver i. We would like to find two 2×1 transmit vectors $u_1$ and $u_2$ each from a one-dimensional vector space and two 4×1 receive vectors $z_1$ and $z_2$ each from a two-dimensional vector space such that $z^*_i G_{ij} u_j = 0$ for all i=1,2 and j=1,2. We can directly construct an interference alignment solution for this problem. Let us pick $u_1$ and $u_2$ arbitrarily. At receiver i at most two directions will be taken by two vectors $G_{ij} u_j$ for j=1,2. Hence, $z_i$ belongs to the space of vectors that is orthogonal to both vectors $G_{ij} u_j$ for j=1,2 and this space is at least two dimensional because $G_{ij}$ is a random 4×2 matrix.

Now let $G_{ij} = H^*_{ji}$, $v_i = u^*_i$, and $w_i = z^*_i$. We have, $z^*_i G_{ij} u_j = 0$ that leads to $u^*_j G^*_{ij} z_i = 0$ and hence $v^*_i H_{ij} w_j = 0$. So, we have found an interference alignment solution for our original problem. In other words, we have found transmit vectors $w_j$ for transmitters j=1,2 that belong to a two dimensional vector space (i.e there are two orthogonal vectors $w_j^{(1)}$, $w_j^{(2)}$ for every transmitter j that satisfy the IA condition) and a receive vector $v_i$ for receivers i=1,2 that belong to a one dimensional vector space such that $v^*_i H_{ij} w_j^{(k)} = 0$, $\forall i,j,k=\{1, 2\}$. This shows that if there exists an IA solution with M+N streams for the case where transmitters have M and receivers have N antennas, then M+N streams are also achievable when the number of antennas at transmitters and receivers are interchanged. Also, alignment of UL streams at one node (DL client) does not lead to alignment of the desired UL streams (reduction in DoF) at another node (AP) due to the channels being random in nature.

It is noted that the present principles introduce a new interpretation of degrees of freedom (DoF) in the network. Classically DoF is defined for collection of independent links in the network. In contrast we introduce DoF per nodes. Furthermore, we introduce the technique of dividing a network into an interference network and a desired communication network, where the former includes the links over which the actual data transmission is performed and the latter consists of the link that do not carry information and only cause interference to their corresponding receivers. We tied back our definition of per node DoF to the classical concept of DoF and further showed its usefulness in several new areas and problems, including simpler interpretation of DoF, separation of dealing with interference in the network from communication in the desired network, successive application of interference removal by applying the technique over partial interference network, and considering several new scenarios of interference alignment problem particularly in the form of full bipartite interference network.

In one embodiment, the problem of interference alignment in FBIN has particular importance in the context of cellular networks and dealing with interference in single or multiple cells especially when full duplex radios are possible to use. As we discussed the scalability of throughput in a wireless systems with multiple cells requires tight coordination between the access point. However, recent work have shown that global coordination and information exchange is not in fact necessary due to the fact that the interference is usually strong in a local vicinity and would not spread in the network globally. Therefore huge complexity and overhead of the global information exchange and the exhaustive burden of implementing a tight coordination between all access points can be replaced by coordination between neighboring cells that is much more manageable. We note that similar local coordination might be enough for the purpose of interference alignment particularly when full duplex access points are deployed.

It is noted that the present principles may be employed for the use of full duplex in cellular systems by characterizing the gain of using full duplex access point versus using half duplex access point. It has also been shown that by exchanging HD APs to FD APs doubling of the spectral efficiency is possible in single cell or 2-cell network with full cooperation between their access points according to the present principles.

It is noted that although the above configuration is illustratively depicted according to the present principles, other sorts of configurations may also be employed according to the present principles.

Figure 5:
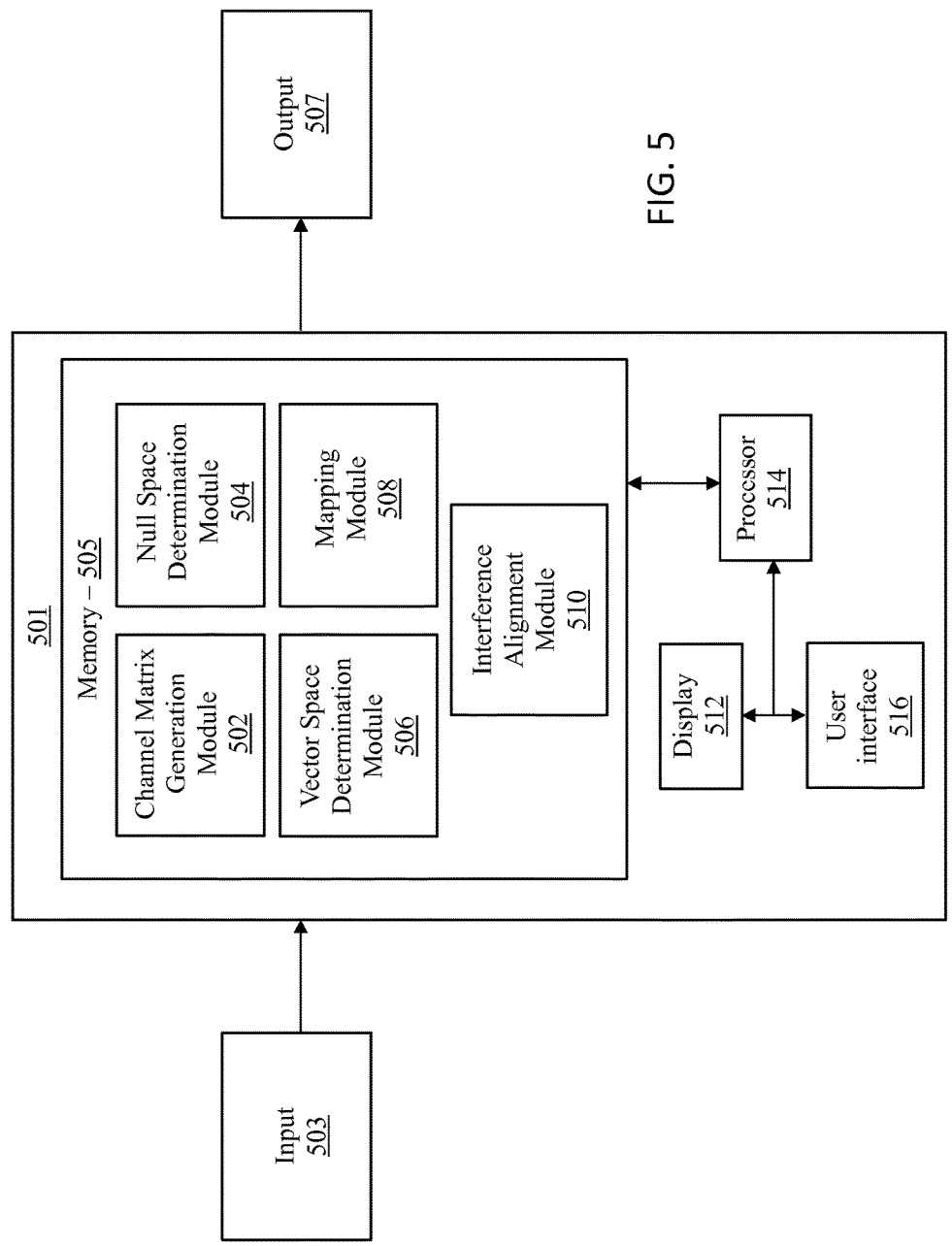
FIG. 5 is a block diagram illustrating a system for performing interference alignment in a network (e.g., a network with asymmetrical channel dimensions) in accordance with one embodiment of the present principles.

Referring now to FIG. 5, a block diagram illustrating a system 501 for performing interference alignment in a network (e.g., a network with asymmetrical channel dimensions) is illustratively depicted according to the present principles. The system 501 may include a workstation or system 501. The system 501 preferably includes one or more processors 514 and memory 505 for storing applications, modules, and other data.

In one embodiment, the system 501 may include one or more displays 512 for viewing. The displays 512 may permit a user to interact with the system 501 and its components and functions. This may be further facilitated by a user interface 516, which may include a mouse, joystick, or any other peripheral or control to permit user interaction with the system 501 and/or its devices. It should be understood that the components and functions of the system 501 may be integrated into one or more systems or workstations.

In one embodiment, the system 501 may receive input 503, which may include computer code (e.g., C++) or other data. The system 501 may also include a plurality of modules, which may include one or more Channel Matrix Generation modules 502, Null Space Determination modules 504, Vector Space Determination modules 506, Mapping modules 208, and/or Interference Alignment modules 216. In one embodiment, after the Interference Alignment is performed in the Interference Alignment modules 216, the final output 507 may be generated and output for use during subsequent runs. While the above-mentioned system and modules are illustratively provided, it is contemplated that other sorts of systems and modules may also be employed according to the present principles.

Figure 6:
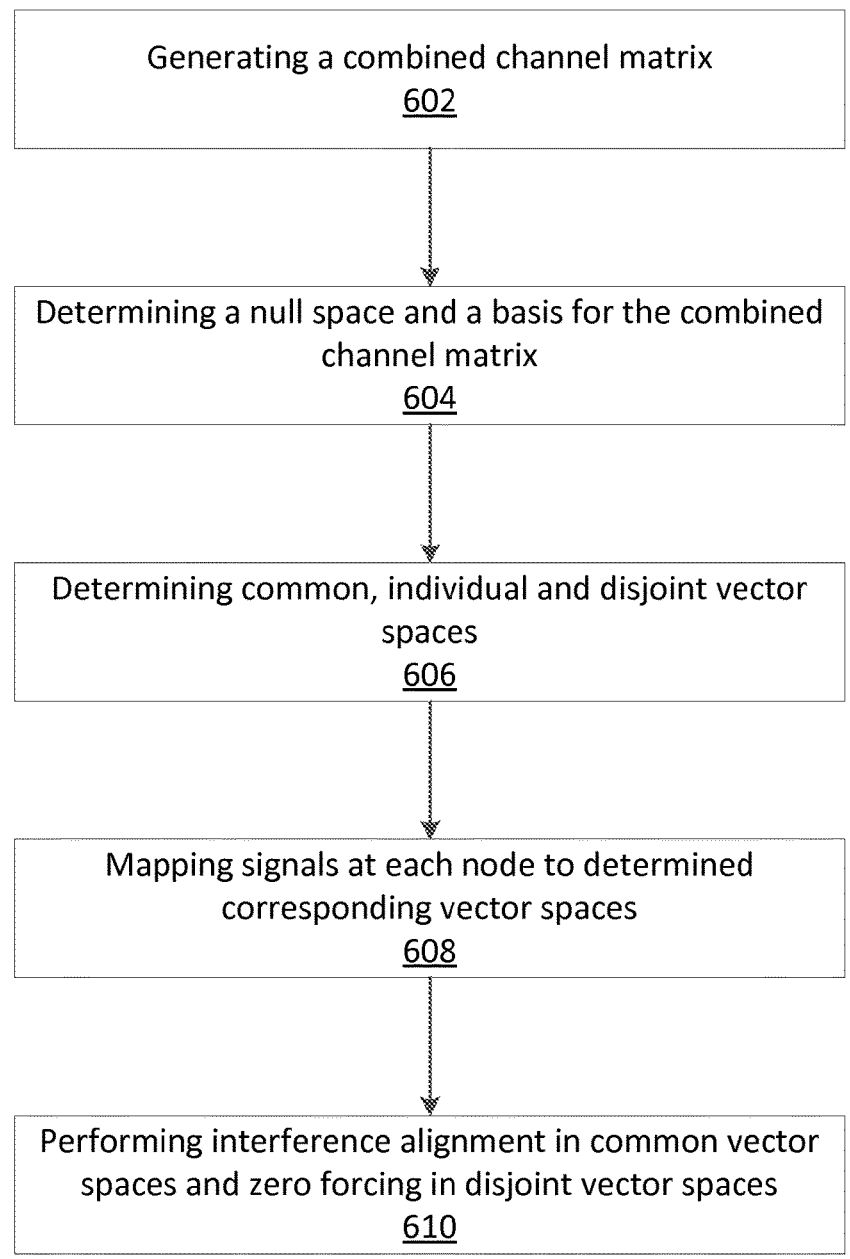
FIG. 6 is a block/flow diagram illustrating a system for performing interference alignment in a network (e.g., a network with asymmetrical channel dimensions) in accordance with one embodiment of the present principles.

Referring now to FIG. 6, a block/flow diagram illustrating a method 600 for performing interference alignment in a network (e.g., a network with asymmetrical channel dimensions) is illustratively depicted according to the present principles. In one embodiment, a combined channel matrix including two or more channels may be generated in block 602, and a null space and a basis for the combined channel matrix may be determined in block 604.

In one embodiment, common, individual, and disjoint vector spaces may be determined in block 606. In one embodiment, common vector space may be determined for each of one or more receiving nodes and each or one or more transmitting nodes, disjoint vector spaces for each of the one or more nodes may be determined based on the common vector space for each of the one or more nodes, and individual vector spaces may be determined based on the common and the disjoint vector spaces. Signals may be mapped at each node to determined corresponding vector spaces in block 608. Interference alignment may be performed in common vector spaces, and zero forcing may be performed in disjoint vector spaces in block 610 according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for interference alignment for full-duplex communication in a communications network with asymmetrical channel dimensions, comprising:
    generating a combined channel matrix including two or more channel matrices with asymmetrical channel dimensions;
    determining a null space and a basis for the combined channel matrix;
    determining common, individual, and disjoint vector spaces, wherein:
        common vector space is determined for each of one or more receiving nodes and each or one or more transmitting nodes,
        disjoint vector spaces for each of the one or more nodes are determined based on the common vector space for each of the one or more nodes, and disjoint vector spaces for each of the one or more transmitting nodes are obtained by determining an inverse image of each of the channel matrices through a corresponding channel, and
        individual vector spaces are determined based on the common and the disjoint vector spaces;
    mapping signals at each of the one or more nodes to determined corresponding vector spaces; and
    performing only interference alignment in common vector spaces and zero forcing only in disjoint vector spaces using a hardware processor.

2. The method of claim 1, wherein the combined channel matrix is obtained by multiplying at least an inverse of a first channel matrix with at least a second channel matrix.

3. The method as recited in claim 1, wherein the communications network is a heterogeneous communications network.

4. The method as recited in claim 1, wherein the communications network is a single-cell communication network.

5. The method as recited in claim 1, wherein the common vector spaces at each of the one or more transmitting nodes is found by determining an inverse image of the common vector space of one or more receiving nodes at each of the one or more transmitting nodes.

6. The method as recited in claim 1, wherein the interference alignment is performed to address uplink-downlink interference (UDI) interference where multiple communications links are active.

7. A system for interference alignment for full-duplex communication in a communications network with asymmetrical channel dimensions, comprising:
    a plurality of modules, each module including at least one processor, and a memory, the processor being configured to:
        generate, using a channel matrix generation module, a combined channel matrix including two or more channel matrices with asymmetrical channel dimensions;
        determine, using a null space determination module a null space and a basis for the combined channel matrix;
        determine, using a vector space determination module, common, individual, and disjoint vector spaces, wherein:
            common vector space is determined for each of one or more receiving nodes and each or one or more transmitting nodes,
            disjoint vector spaces for each of the one or more nodes are determined based on the common vector space for each of the one or more nodes, and disjoint vector spaces for each of the one or more transmitting nodes are obtained by determining an inverse image of each of the channel matrices through a corresponding channel, and
            individual vector spaces are determined based on the common and the disjoint vector spaces;

map, using a mapping module, signals at each of the one or more nodes to determined corresponding vector spaces; and perform, using an interference alignment module, only interference alignment in common vector spaces and zero forcing only in disjoint vector spaces using a hardware processor.

8. The system as recited in claim 7, wherein the combined channel matrix is obtained by multiplying at least an inverse of a first channel matrix with at least a second channel matrix.

9. The system as recited in claim 7, wherein the communications network is a heterogeneous communications network.

10. The system as recited in claim 7, wherein the communications network is a single-cell communication network.

11. The system as recited in claim 7, wherein the common vector spaces at each of the one or more transmitting nodes is found by determining an inverse image of the common vector space of one or more receiving nodes at each of the one or more transmitting nodes.

12. The system as recited in claim 7, wherein the interference alignment is performed to address uplink-downlink interference (UDI) interference where multiple communications links are active.

* * * * *